US010667342B2

(12) United States Patent
Davidovic et al.

(10) Patent No.: US 10,667,342 B2
(45) Date of Patent: May 26, 2020

(54) CONFIGURABLE LIGHT SOURCE DRIVER DEVICE

(71) Applicant: Avago Technologies International Sales Pte. Limited, Singapore (SG)

(72) Inventors: Milos Davidovic, Vienna (AT); Robert Swoboda, Vienna (AT)

(73) Assignee: Avago Technologies International Sales Pte. Limited, Singapore (SG)

( * ) Notice: Subject to any disclaimer, the term of this patent is extended or adjusted under 35 U.S.C. 154(b) by 1124 days.

(21) Appl. No.: 14/674,008

(22) Filed: Mar. 31, 2015

(65) Prior Publication Data

US 2016/0295649 A1 Oct. 6, 2016

(51) Int. Cl.
*H05B 33/08* (2020.01)
(52) U.S. Cl.
CPC ..... *H05B 33/0815* (2013.01); *H05B 33/0845* (2013.01); *H05B 33/0884* (2013.01); *Y02B 20/346* (2013.01)

(58) Field of Classification Search
None
See application file for complete search history.

(56) References Cited

U.S. PATENT DOCUMENTS

| | | | |
|---|---|---|---|
| 8,044,699 B1 * | 10/2011 | Kelly | H03K 19/018521 327/333 |
| 8,324,968 B2 | 12/2012 | Honda | |
| 2012/0268032 A1 * | 10/2012 | Yem | H05B 33/0824 315/294 |
| 2013/0047018 A1 * | 2/2013 | Chen | G06F 1/3206 713/323 |
| 2014/0042905 A1 * | 2/2014 | Lee | H05B 33/0809 315/85 |
| 2014/0300274 A1 * | 10/2014 | Acatrinei | H05B 33/0815 315/85 |
| 2014/0346874 A1 * | 11/2014 | Fang | H02M 3/33523 307/31 |
| 2015/0237693 A1 * | 8/2015 | Knoedgen | H05B 33/0815 315/224 |
| 2016/0294282 A1 * | 10/2016 | Herfurth | H02M 3/157 |

FOREIGN PATENT DOCUMENTS

JP 2007-73781 A 3/2007

* cited by examiner

*Primary Examiner* — Jimmy T Vu
*Assistant Examiner* — Laura Yesildag
(74) *Attorney, Agent, or Firm* — Sheridan Ross P.C.

(57) ABSTRACT

A configurable light source driver device includes circuitry that detects the presence of a resistor when connected to a terminal of the device and automatically configures the device to operate as a differential driver circuit with low EMI emission and a level of circuit stability that is selected on the basis of parasitic impedance conditions of the differential driver circuit. When the terminal is left unconnected, the configurable light source driver device automatically configures itself to operate as a single ended driver circuit with low power consumption and a different level of circuit stability that is selected on the basis of parasitic impedance conditions of the single ended driver circuit. Furthermore, the configurable light source driver device can include a pulse width adjustment circuit for modifying certain operating characteristics of each of the differential driver circuit and the single ended driver circuit.

20 Claims, 9 Drawing Sheets

CONFIGURABLE LIGHT SOURCE DRIVER DEVICE

FIELD OF THE INVENTION

The invention relates to driver devices, and more particularly, to driver devices for driving light sources such as for example a light emitting diode (LED) or a laser diode.

BACKGROUND

Driver devices that generate appropriate currents through light sources such as LEDs and laser diodes are known in the industry. For example, a laser diode driver chip can be used to vary the current propagating through a laser diode in order to modulate the light produced by the laser diode. Driver devices are typically available in two distinct circuit flavors—a single ended driver circuit and a differential driver circuit.

The decision whether to use a single ended driver circuit or a differential driver circuit depends on a variety of factors. For example, in some cases, a single ended driver circuit may be selected so as to keep the driver circuitry simple and also to minimize power consumption. However, some pulse signals that are used in the single ended driver circuit for modulating a light source can have sharp rising and falling edges that constitute transient voltage spikes. Such transient voltage spikes can generate an undesirably high level of electromagnetic interference (EMI).

In addition to the EMI issue, a single ended driver circuit can also suffer from other shortcomings that prevent it from being used beyond certain frequency limits. Such shortcomings can include for example, signal distortion and operational instability (oscillations, resonant conditions, etc.) when the single ended driver circuit is operated at high frequencies.

The EMI problem associated with the single ended driver circuit can be mitigated to some extent by using a differential driver circuit wherein pulses of opposing polarities can be used to cancel out transient voltage spikes and minimize the generation of undesirable EMI. However, while such EMI suppression is desirable, the trade-off associated with using the differential driver circuit includes more circuit complexity and higher power consumption. The circuit complexity can arise as a result of having to address signal distortion and operational instability issues when operating the differential driver circuit at high frequencies.

It is therefore desirable to provide a device that offers flexibility in using either a single ended driver circuit or a differential driver circuit while also addressing at least some of the traditional EMI and circuit instability issues.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale, emphasis instead being placed upon illustrating the principles of the invention. The drawings should not be interpreted as limiting the scope of the invention to the example embodiments shown herein.

WRITTEN DESCRIPTION

Figure 1:
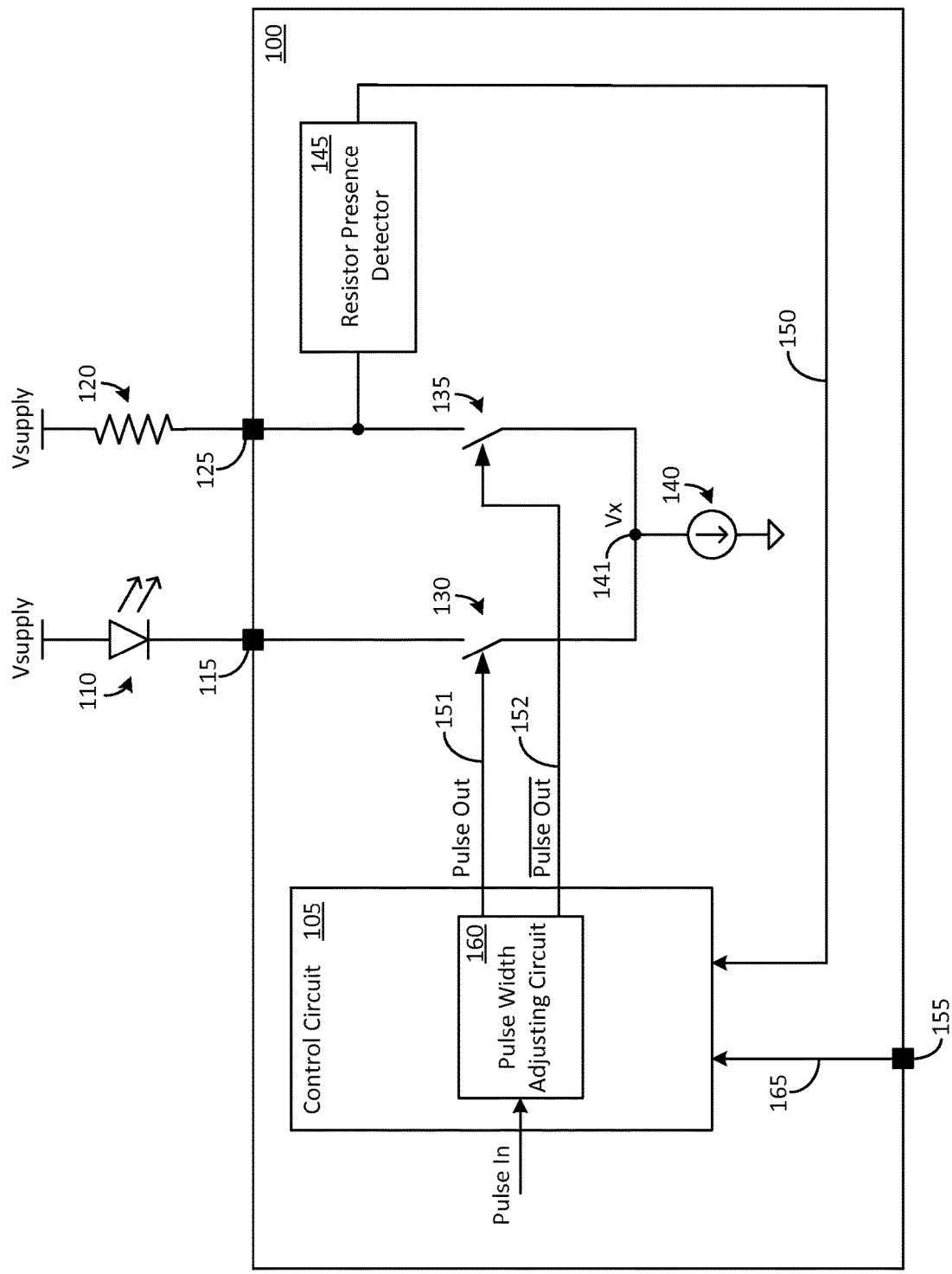
FIG. 1 shows an exemplary embodiment of a configurable light source driver device in accordance with the disclosure.

Throughout this description, embodiments and variations are described for the purpose of illustrating uses and implementations of inventive concepts. The illustrative description should be understood as presenting examples of inventive concepts, rather than as limiting the scope of the concept as disclosed herein. It should be further understood that certain words and terms are used herein solely for convenience and such words and terms should be interpreted as referring to various objects and actions that are generally understood in various forms and equivalencies by persons of ordinary skill in the art. For example, the word "line" as used herein generally refers to a metal track inside an integrated circuit (IC); the words "connected" or "coupled" generally refer to two elements that have electrical connectivity via a metal track or a wire for example; and the word "device" generally refers to a semiconductor chip such as for example, an integrated circuit (IC) or a hybrid microcircuit. It should however be understood that the inventive concepts disclosed herein are not necessarily limited to a "device," and can be implemented in various other ways, such as for example, in the form of a circuit incorporating discrete components located on a printed circuit board (PCB). It should also be understood that the word "example" as used herein is intended to be non-exclusionary and non-limiting in nature. More particularly, the word "exemplary" as used herein indicates one among several examples, and it must be understood that no undue emphasis or preference is being directed to the particular example being described.

Generally, in accordance with a first illustrative embodiment, a configurable light source driver device includes circuitry that detects the presence of a resistor when the resistor is connected to a resistor sensing terminal of the device and automatically configures the device to operate as a differential driver circuit having low EMI emission and a level of circuit stability that is selected on the basis of parasitic impedance conditions of the differential driver circuit. When the resistor sensing terminal is left unconnected, the configurable light source driver device automatically configures itself to operate as a single ended driver circuit with low power consumption and a different level of circuit stability that is selected on the basis of parasitic impedance conditions of the single ended driver circuit. Furthermore, the configurable light source driver device can include a pulse width adjustment circuit for modifying certain operating characteristics of each of the differential driver circuit and the single ended driver circuit.

In accordance with a second illustrative embodiment, a configurable light source driver device includes a configuration select terminal through which a signal can be provided to configure the configurable light source driver device as one of either a differential driver circuit or a single ended driver circuit. Thus, for example, when a logic "1" level signal is applied to the configuration select terminal, the configurable light source driver device automatically configures itself to operate as a differential driver circuit having low EMI emission and a level of circuit stability that is selected on the basis of parasitic impedance conditions of the differential driver circuit. On the other hand, when a logic "0" level signal is applied to the configuration select terminal, the configurable light source driver device automatically configures itself to operate as a single ended driver circuit with low power consumption and a different level of circuit stability that is selected on the basis of parasitic impedance conditions of the single ended driver circuit. In this second illustrative embodiment, circuitry that detects the presence of a resistor (described above with respect to the first illustrative embodiment) can be omitted.

Attention is now drawn to FIG. 1, which shows an exemplary embodiment of a configurable light source driver device 100 that includes various components such as a resistor presence detector 145, a control circuit 105, a current source 140, a first switch 130, and a second switch 135. The first switch 130 is coupled between a light source driver terminal 115 of the configurable light source driver device 100 and the current source 140, while the second switch 135 is coupled between a resistor sensing terminal 125 of the configurable light source driver device 100 and the current source 140. Each of the first switch 130 and the second switch 135 can be a solid state switch (a switching transistor, for example) or a mechanical switch (a relay, for example) in various implementations. The light source driver terminal 115 is an externally accessible terminal that can be used to connect a light source 110 to the configurable light source driver device 100. In this exemplary embodiment, the light source 110 (which can be any of a number of light sources such as for example, a light emitting diode (LED) or a laser diode) is connected to a positive voltage source (Vsupply).

In this exemplary embodiment, the control circuit 105 includes a pulse width adjusting (PWA) circuit 160 that generates a first control signal ("pulse out") and a second control signal ("pulse out bar"). These two control signals can be generated by using a "pulse in" signal that is provided to the PWA circuit 160 via an externally accessible pin (not shown) of the configurable light source driver device 100 or from a circuit (not shown) located inside the configurable light source driver device 100.

The first switch 130 is controlled by the first control signal ("pulse out") that is provided to the first switch 130 via line 151. When the first control signal places the first switch 130 in a closed condition, the current source 140 gets coupled to the light source 110 and the resulting current causes the light source 110 to be turned on. On the other hand, when the first control signal places the first switch 130 in an open condition, the current source 140 is disconnected from the light source 110 and current stops flowing through the light source 110. Thus, the light source 110 can be alternatively turned on and off (so as to operate as a modulated light source) based on a duty cycle of the first control signal.

The resistor sensing terminal 125 is an externally accessible terminal that can be used to connect a resistor 120 to the configurable light source driver device 100. More particularly, the resistor 120 is connected to the resistor sensing terminal 125 when it is desired to allow the configurable light source driver device 100 to automatically configure itself as a differential driver circuit. Alternatively, the resistor sensing terminal 125 is left in an unconnected condition when it is desired to allow the configurable light source driver device 100 to automatically configure itself as a single ended driver. The manner in which the configurable light source driver device 100 carries out such automatic configurations will be described below in more detail.

In the exemplary embodiment shown in FIG. 1, one end of the resistor 120 is connected to the resistor sensing terminal 125 and an opposing end is connected to the positive voltage source (Vsupply). Inside the configurable light source driver device 100, the resistor sensing terminal 125 is connected to the second switch 135 that is controlled by the second control signal ("pulse out bar") of an opposite polarity to the first control signal ("pulse out"). The second control signal is provided to the second switch 135 by the PWA circuit 160 via line 152. When the second control signal places the second switch 135 in a closed condition, the current source 140 gets connected to the resistor 120 and current flows through the resistor 120. On the other hand, when the second control signal places the second switch 135 in an open condition, the current source 140 is disconnected from the resistor 120 and current stops flowing through the resistor 120. Thus, current flow through the resistor 120 is alternatively turned on and off based on a duty cycle of the second control signal. Because the second control signal is opposite in polarity to the first control signal, current flows through the resistor when there is no current flowing through the light source 110 and vice-versa. As a result, the overall current drawn from the positive voltage source (Vsupply) remains substantially constant with low ripple when the configurable light source driver device 100 configures itself as a differential driver circuit. The voltage Vx at the node 141 also remains at a substantially constant level with low ripple.

In contrast, when the configurable light source driver device 100 is configured as a single ended driver (i.e., no resistor 120 and no corresponding current flow through the second switch 135) the overall current drawn from the positive voltage source (Vsupply) turns on and off in accordance with the switching state of the first switch 130. While this condition may result in a higher level of voltage ripple in comparison to the differential circuit configuration, it should be understood that the overall amount of current drawn from Vsupply in the single ended configuration is lower than the amount of current drawn in the differential circuit configuration, thus resulting in lower power consumption.

In one example implementation, the value of the resistor 120 is selected to match a nominal impedance of the light source 110 in an "on" condition. As a result of such a selection, the amount of current flowing through the resistor 120 when the second switch 135 is in a closed condition will substantially match the amount of current flowing through the light source 110 when the first switch 130 is in a closed condition, thereby minimizing voltage fluctuations in Vsupply and minimizing EMI emissions. In an alternative example implementation, the value of the resistor 120 can be selected so as to create an average voltage potential across the resistor 120 that matches an average voltage potential across the light source 110. Typically, the value of the resistor 120 can be selected from a 5-200 ohms range of resistance values when the light source 110 is an LED.

Attention is now drawn to the resistor presence detector 145, which is used to determine whether the resistor 120 is connected to the resistor sensing terminal 125 or whether the resistor sensing terminal 125 has been left unconnected. When the resistor 120 is connected to the resistor sensing terminal 125, a voltage is present at the resistor sensing terminal 125 and current flows into the resistor sensing terminal 125 from the Vsupply that is connected to the remote end of the resistor 120. In one exemplary embodiment, the resistor presence detector 145 includes a voltage detector that is used to detect the presence of the voltage when present at the resistor sensing terminal 125 and infer therefrom that the resistor 120 is connected to the resistor sensing terminal 125. Alternatively, the resistor presence detector 145 infers that the resistor 120 is not connected to the resistor sensing terminal 125 when no voltage is present at the resistor sensing terminal 125.

In another exemplary embodiment, the resistor presence detector 145 includes a current detector (not shown). It should be understood that the current detector would be configured in a series connection between the resistor sensing terminal 125 and the second switch 135. In this configuration, the resistor presence detector 145 infers the presence or absence of the resistor 120 on the basis of detecting a current flow through the current detector when the resistor 120 is connected to the resistor sensing terminal 125.

Irrespective of the manner in which the resistor presence detector 145 determines whether the resistor 120 is connected to the resistor sensing terminal 125 or whether the resistor sensing terminal 125 has been left unconnected, the detector output signal of the resistor presence detector 145 can be provided to the control circuit 105 via the line 150 in various forms.

In a first example implementation, the detector output signal of the resistor presence detector 145 is provided as a presence indicator signal in a binary level format. For example, when the resistor 120 is connected to the resistor sensing terminal 125, the presence indicator signal is a "1" level that is indicative of a differential driver circuit configuration. When the resistor sensing terminal 125 is left unconnected, the presence indicator signal is a "0" level that is indicative of a single ended driver circuit configuration. The control circuit 105 can use the binary formatted presence indicator signal to drive, for example, both the first switch 130 and the second switch 135 when the presence indicator signal is at a "1" level and drive only the first switch 130 when the presence indicator signal is at a "0" level. In other embodiments, the presence indicator signal can be used for other purposes by the control circuit 105.

In a second example implementation, the resistor presence detector 145 can include an analog-to-digital converter (ADC) that is used by the resistor presence detector 145 to provide an amplitude indicator signal in a digital word format. For example, a first 8-bit digital word could be indicative of a first voltage/current value and a second 8-bit digital word could be indicative a second voltage/current value. Thus, various digital words could be indicative of various voltage/current values.

In a third example implementation, the output of the resistor presence detector 145 is provided as an amplitude indicator signal in an analog format. For example, a first voltage/current amplitude would represent a 1:1 or a 1:n value of a first voltage/current value at the resistor sensing terminal 125, and a second voltage/current amplitude would represent a 1:1 or a 1:n value of a second voltage/current value at the resistor sensing terminal 125. Thus, for example, when n=0.5, a 1V output of the resistor presence detector 145 would be indicative of 2V being present at the resistor sensing terminal 125 and so on. In another example, when n=10, a 20 mA output of the resistor presence detector 145 would be indicative of a 2 mA current flow through a current detector of the resistor presence detector 145, and so on.

In whatever form, the detector output signal of the resistor presence detector 145 that is carried on line 150 can be used in the control circuit 105 for a variety of purposes, such as for example, modifying the pulse width and/or the pulse shape of the "pulse out" and "pulse out bar" signals on lines 151 and 152. In one example implementation, the pulse widths and/or pulse shapes of each of the "pulse out" and "pulse out bar" signals is set in accordance with a differential driver circuit configuration when the signal on line 150 is indicative of the resistor 120 being connected to the resistor sensing terminal 125, and the pulse width and/or the pulse shape of only the "pulse out" signal is set in accordance with a single ended driver circuit configuration when the signal on line 150 indicates that the resistor 120 is not connected to the resistor sensing terminal 125. In another example implementation, the pulse width and/or the pulse shape of the "pulse out" and "pulse out bar" signals on lines 151 and 152 may be left unmodified irrespective of the configurable light source driver device 100 being placed in either the differential driver circuit configuration or the single ended driver circuit configuration.

It should be understood however, that when configured as a single ended driver, the "pulse out bar" signal can be viewed as a redundant signal (because the second switch 135 is not needed for single driver circuit operation) that can be either disabled or left active. In some cases, disabling the "pulse out bar" signal may provide certain benefits such as for example, a reduction in power consumption and/or a reduction in EMI emission.

In some embodiments, in lieu of or in addition to, the output of the resistor presence detector 145 that is provided to the control circuit 105 via line 150, an external signal can be provided to the control circuit 105 via an externally accessible terminal 155. This external signal can be used by the control circuit 105 for various purposes such as for example modifying the shape and/or duty cycle of the "pulse out" and/or "pulse out bar" signals. Furthermore, in one example implementation, the externally accessible terminal 155 is configured as a "configuration select" terminal that can be used for configuring the configurable light source driver device as one of either a differential driver circuit or a single ended driver circuit. In this example implementation, the resistor presence detector 145 can be eliminated from the configurable light source driver device 100 if so desired.

Figure 2:
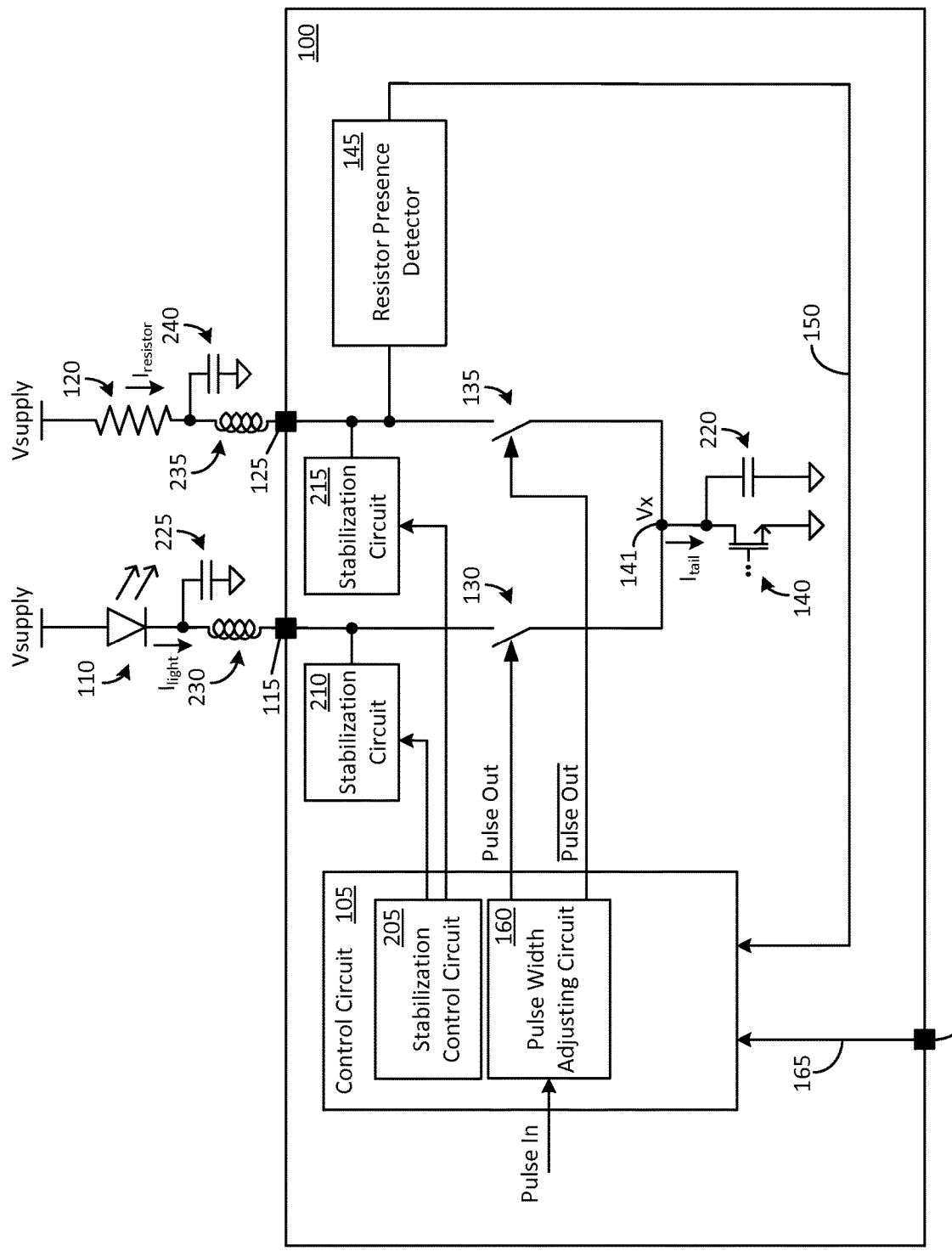
FIG. 2 shows some elements associated with circuit stabilization that can be incorporated into the configurable light source driver device of FIG. 1 in accordance with the disclosure.

Attention is now drawn to FIG. 2, which shows some elements associated with circuit stabilization that can be incorporated into the configurable light source driver device 100 in accordance with the disclosure. The stabilization control circuit 205 in the control circuit 105 can be used to provide switch control signals to a first stabilization circuit 210 and a second stabilization circuit 215 located inside the configurable light source driver device 100. It should be understood that the first stabilization circuit 210 and the second stabilization circuit 215 are merely examples of where such stabilization circuits can be provided. In other embodiments, additional stabilization circuits can be provided in various other locations inside the configurable light source driver device 100 such as for example, in one of the terminals of a solid state device when the solid state device is used for implementing the first switch 130 and/or the second switch 135.

The various components of the first stabilization circuit 210 can include one or more inductors, capacitors, and resistors, that are configured to compensate for various parasitic elements associated with the light source driver terminal 115 and the lines (wires, metal tracks etc.) that are used to connect the light source 110 to the light source driver terminal 115. These parasitic elements are symbolically shown in FIG. 2 in the form of a capacitor 225 and an inductor 230. In some embodiments, the various elements of the first stabilization circuit 210 can also be configured to operate as a "snubber" circuit to quench transients that may be generated when the first switch 130 is activated. Such transients can be generated for example as a result of the presence of the inductor 230 and other parasitic elements associated with the first switch 130. In yet other embodiments, the various elements of the first stabilization circuit 210 can be configured to operate as a wave-shape control circuit to modify the transition times of the pulsed current ($I_{light}$) that propagates from the light source to the first switch 130.

The various elements of the second stabilization circuit 215 can include one or more inductors, capacitors, and resistors, that are configured to compensate for various parasitic elements associated with the resistor sensing terminal 125 and the lines (wires, metal tracks etc.) that are used to connect the resistor 120 to the resistor sensing terminal 125. These parasitic elements are symbolically shown in FIG. 2 in the form of a capacitor 240 and an inductor 235. The various configurations and applications of the second stabilization circuit 215 can be understood in view of the description provided above with respect to the first stabilization circuit 210 and will not be repeated here in the interest of brevity. The operation of the first stabilization circuit 210 and the second stabilization circuit 215 in view of various switch control signals from the stabilization control circuit 205 (that is a part of the control circuit 105) is described below in further detail using other figures.

It should be understood that in some embodiments, the stabilization control circuit 205 as well as the PWA circuit 160 may be incorporated and used in the control circuit 105. However, in some other embodiments, only one of the stabilization control circuit 205 and the PWA circuit 160 may be incorporated into the control circuit 105. For example, the stabilization control circuit 205 as well as the PWA circuit 160 may be incorporated into the control circuit 105 in a configurable light source driver device 100 that is intended for use in high frequency operations where parasitic impedances and/or circuit characteristics (such as undesirable signal feedback) can play a big role. On the other hand, only the PWA circuit 160 may be incorporated into the control circuit 105 in a configurable light source driver device 100 that is intended for use in low frequency operations where parasitic impedances are relatively unimportant for effective circuit operation.

Figure 3:
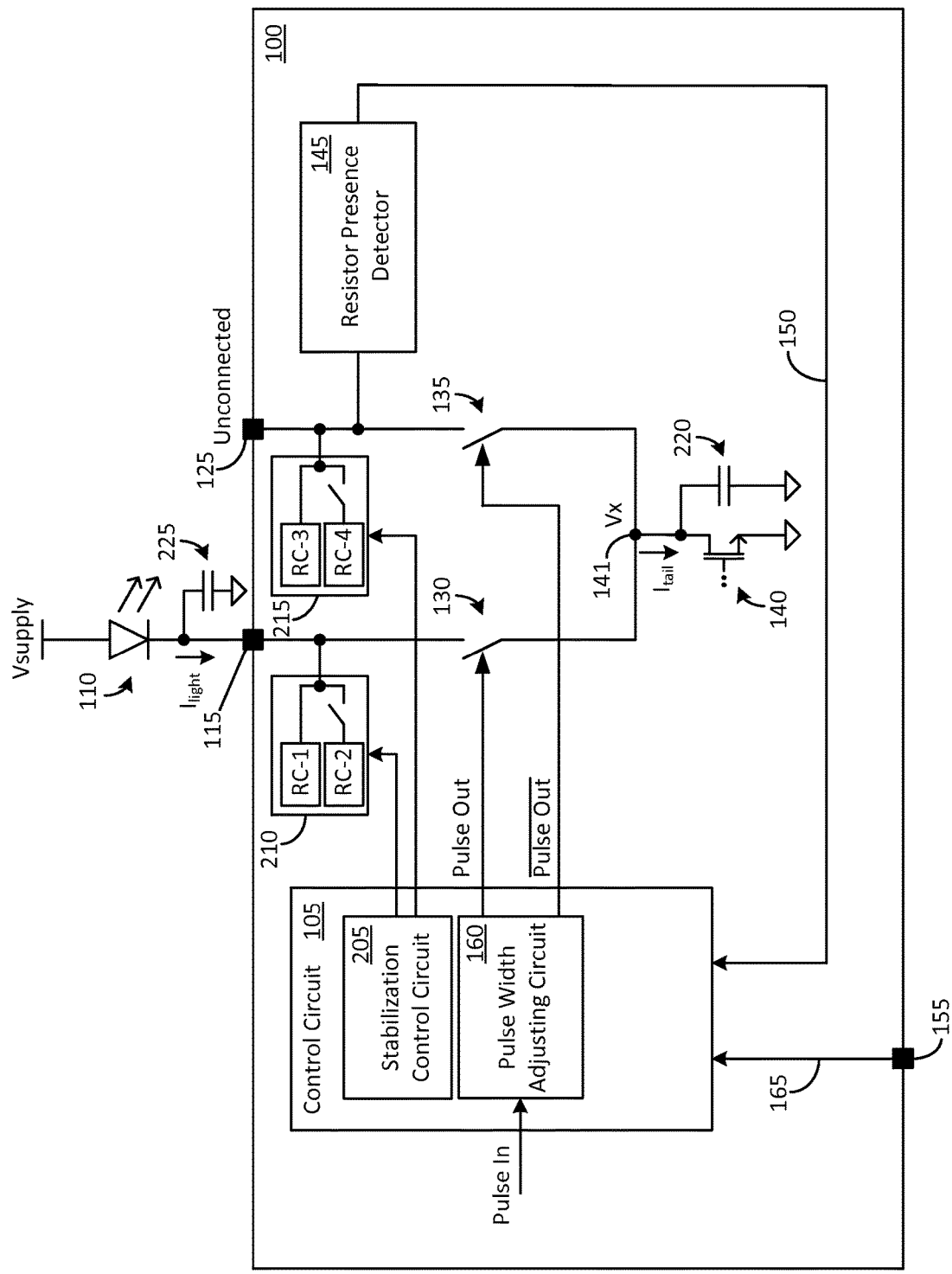
FIG. 3 shows the configurable light source driver device of FIG. 2 configured to operate as a single ended driver circuit in accordance with the disclosure.

FIG. 3 shows the configurable light source driver device 100 configured to operate as a single ended driver circuit in accordance with the disclosure. In this configuration, the resistor sensing terminal 125 is left unconnected. The resistor presence detector 145 senses a lack of voltage/current at the resistor sensing terminal 125 and generates a detector output signal on line 150 (such as for example, a presence indicator signal in a binary level format) to indicate to the control circuit 105 that the configurable light source driver device 100 should be configured to operate as a single ended driver circuit. In a first example implementation, upon receiving this indication, the PWA adjusting circuit 160 drives the first switch 130 with the "pulse out" signal and inhibits providing of the "pulse out bar" signal to the second switch 135. In a second example implementation, upon receiving this indication, the PWA adjusting circuit 160 modifies one or both of a shape and a duty cycle of the "pulse out" signal used to drive the first switch 130 and inhibits providing of the "pulse out bar" signal to the second switch 135. In a third example implementation, upon receiving this indication, the PWA circuit 160 modifies one or both of a shape and a duty cycle of the "pulse out" signal as well as the "pulse out bar" signal.

The output of the resistor presence detector 145 can also be used by the control circuit 105 to configure the stabilization control circuit 205 to generate and transmit stabilization control signals to one or both of the stabilization circuit 210 and the stabilization circuit 215. In the example embodiment shown in FIG. 3, a first stabilization control signal that is provided by the stabilization control circuit 205 to the stabilization circuit 210 activates one or both of a pair of switches in the stabilization circuit 210 so as to couple one of an RC-1 circuit or an RC-2 circuit to the light source driver terminal 115. In this example, the RC-1 circuit is shown coupled to the light source driver terminal 115. Similarly, a second stabilization switch control signal that is provided by the stabilization control circuit 205 to the stabilization circuit 215 activates one or both of a pair of switches in the stabilization circuit 215 so as to couple one of an RC-3 circuit or an RC-4 circuit to the resistor sensing terminal 125. In this example, the RC-3 circuit is shown coupled to the resistor sensing terminal 125.

In one example implementation, each of the RC-1 and RC-2 circuits is implemented in the form of a resistor connected in series with a capacitor. However, in other implementations, the resistor and capacitor elements can be arranged in other ways including in conjunction with additional elements such as an inductor for example. The RC-1 and RC-2 circuit component values can be selected on the basis of one or more of the following: the parasitic impedance at the light source driver terminal 115, the parasitic impedance associated with the current source 140, and/or the parasitic impedances associated with other parts of the configurable light source driver device 100 (such as the current source 140 that is symbolically shown in the form of a transistor connected in parallel with a parasitic capacitor 220). Typically, the RC-2 circuit component values are different from the RC-1 values because the parasitic impedances that come into play in the differential driver circuit configuration are different than the parasitic impedances that come into play in the single ended driver circuit configuration.

The RC-3 and RC-4 circuit component values can be selected on the basis of one or more of the following: the parasitic impedance at the resistor sensing terminal 125, the parasitic impedance associated with the current source 140, and/or the parasitic impedances associated with other parts of the configurable light source driver device 100. Furthermore, in some cases, due to the nature of the parasitic elements that are being compensated, the RC-1 and RC-3 circuits can be different from each other, and the RC-2 and RC-4 circuits can be also different from each other. However, in some other cases, (for example where stabilization is not primarily based on parasitic element compensation), the RC-1 and RC-3 circuits can be substantially similar (or identical) to each other, and the RC-2 and RC-4 circuits can be substantially similar (or identical) to each other as well.

Figure 4:
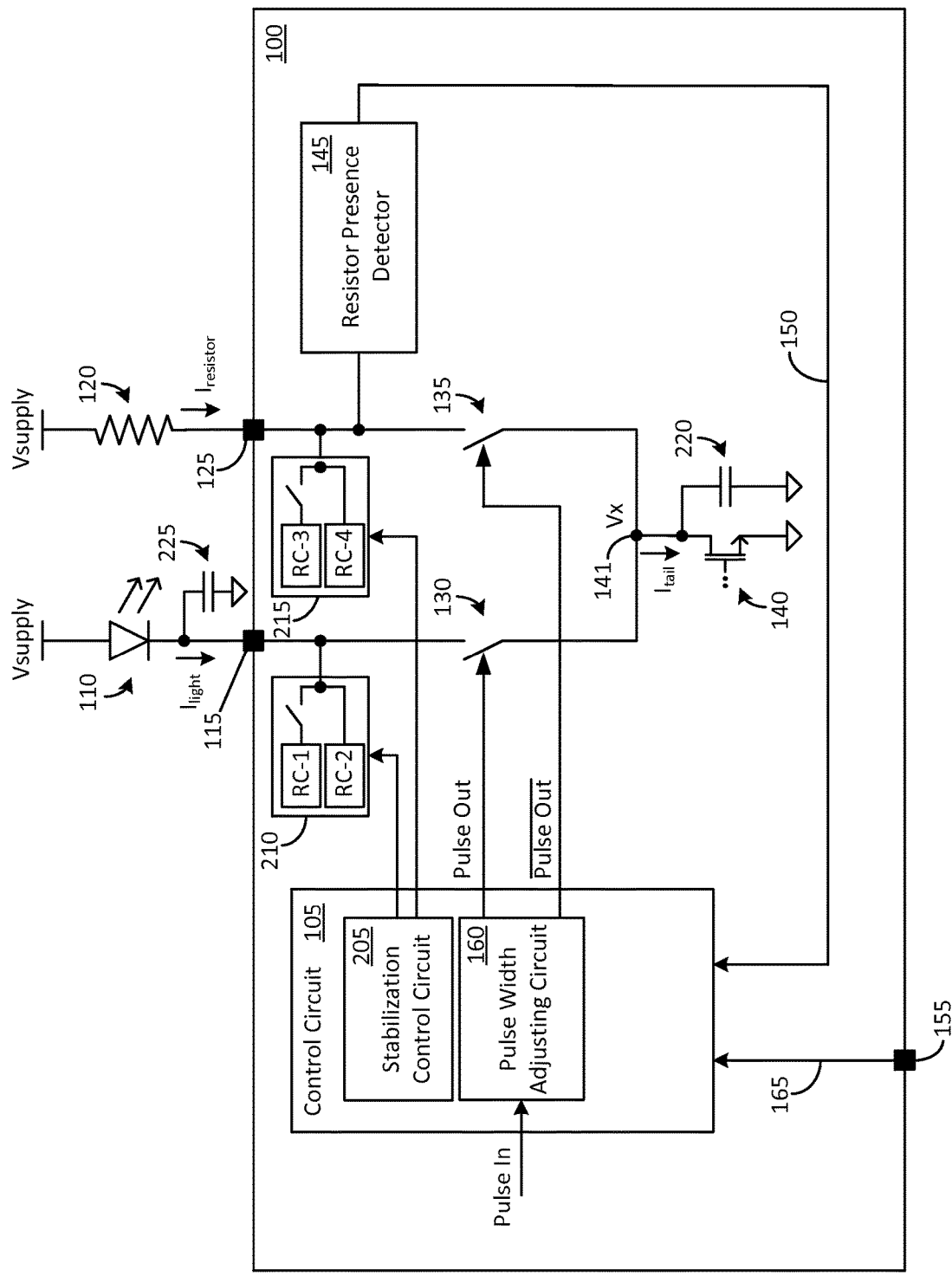
FIG. 4 shows the configurable light source driver device of FIG. 2 configured to operate as a differential driver circuit in accordance with the disclosure.

FIG. 4 shows the configurable light source driver device 100 configured to operate as a differential driver circuit in accordance with the disclosure. In this configuration, the resistor 120 is connected to the resistor sensing terminal 125. The resistor presence detector 145 senses a voltage/current at the resistor sensing terminal 125 and generates an output on line 150 (such as for example, a presence indicator signal in a binary format) to indicate to the control circuit 105 that the configurable light source driver device 100 should be configured to operate as a differential driver circuit.

Upon receiving this indication, the PWA adjusting circuit 160 drives the first switch 130 with the "pulse out" signal and drives the second switch 135 with the "pulse out bar" signal. In some embodiments, the PWA adjusting circuit 160 modifies one or both of a shape and a duty cycle of the "pulse out" signal and/or the "pulse out bar" signal.

The output of the resistor presence detector 145 can also be used by the control circuit 105 to configure the stabilization control circuit 205 to generate and transmit stabilization control signals to one or both of the stabilization circuit 210 and the stabilization circuit 215. In the example embodiment shown in FIG. 4, a first stabilization control signal that is provided by the stabilization control circuit 205 to the stabilization circuit 210 activates one or both of a pair of switches in the stabilization circuit 210 so as to couple an opposing one of the RC-1 circuit or RC-2 circuit that was selected in the single driver circuit configuration. Thus, as shown in FIG. 4, the RC-2 circuit is coupled to the light source driver terminal 115 (in place of the RC-1 circuit that is coupled to the light source driver terminal 115 when the configurable light source driver device 100 is placed in the singe ended driver configuration). Similarly, the RC-4 circuit in the stabilization circuit 215 is shown coupled to the resistor sensing terminal 125 rather than the RC-3 circuit that was previously connected.

Figure 5:
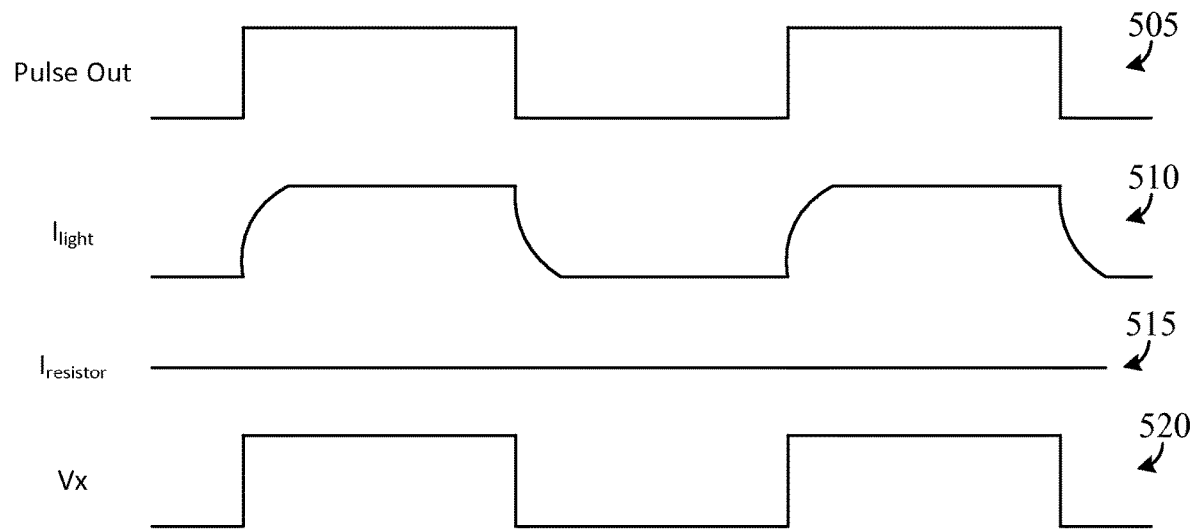
FIG. 5 shows some waveforms associated with the configurable light source driver device configured as a single ended driver circuit in accordance with the disclosure.

FIG. 5 shows some waveforms associated with the configurable light source driver device 100 configured as a single ended driver circuit in accordance with the disclosure. The various waveforms can be better understood by referring to certain elements that are shown in FIG. 3, which shows the configurable light source driver device 100 configured as a single ended driver circuit. Waveform 505 is the "pulse out" signal provided by the control circuit 105 to the first switch 130. Waveform 510 is indicative of the current flow $I_{light}$ that flows from the light source 110 into the configurable light source driver device 100 via the light source driver terminal 115. The transition times of the rising edges and falling edges of the waveform 510 are shaped on the basis of the RC-1 circuit elements (described above with respect to FIG. 3) and provide stabilization by minimizing or eliminating transient spikes on these edges. As a result of the configurable light source driver device 100 being configured as a single ended driver circuit (i.e., the resistor sensing terminal 125 left unconnected) waveform 515 represents a "0" level voltage/current. The waveform 520 represents the voltage Vx at the node 141 when the configurable light source driver device 100 configured as a single ended driver circuit. The pulsed voltage waveform reflects the on-off activation of the first switch 130 with the second switch 135 being inactive in the single ended driver circuit configuration.

Figure 6:
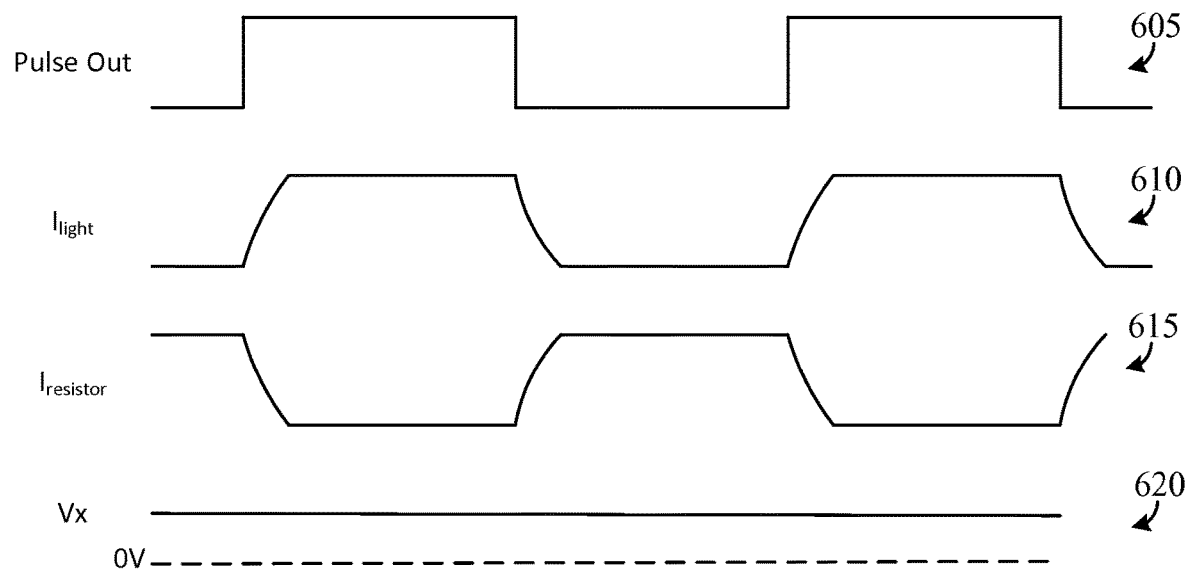
FIG. 6 shows some waveforms associated with the configurable light source driver device configured as a differential driver circuit in accordance with the disclosure.

FIG. 6 shows some waveforms associated with the configurable light source driver device 100 configured as a differential driver circuit in accordance with the disclosure. The various waveforms can be better understood by referring to certain elements that are shown FIG. 4, which shows the configurable light source driver device 100 configured as a differential driver circuit. Waveform 605 is the "pulse out" signal provided by the control circuit 105 to the first switch 130. Waveform 610 indicates the current flow $I_{light}$ that flows from the light source 110 into the configurable light source driver device 100 via the light source driver terminal 115. The transition times of the rising edges and falling edges of the waveform 610 are shaped on the basis of the RC-2 circuit elements (described above with respect to FIG. 4) and provide stabilization by minimizing or eliminating transient spikes on these edges. As a result of the configurable light source driver device 100 being configured as a differential driver circuit (i.e., the resistor 120 is connected to the resistor sensing terminal 125), waveform 615 represents a waveform having an opposite polarity to the waveform 610. The waveform 520 represents the voltage Vx at the node 141. The substantially steady state voltage condition of Vx is a result of both the first switch 130 and the second switch 135 being alternatively activated in the differential driver mode. The steady state voltage condition of Vx (as well as Vsupply) results in a reduction of EMI emissions in the differential driver configuration relative to the single ended driver configuration. In some implementations, various operating parameters of the differential driver configuration can be set on the basis of a desired EMI threshold.

Figure 7:
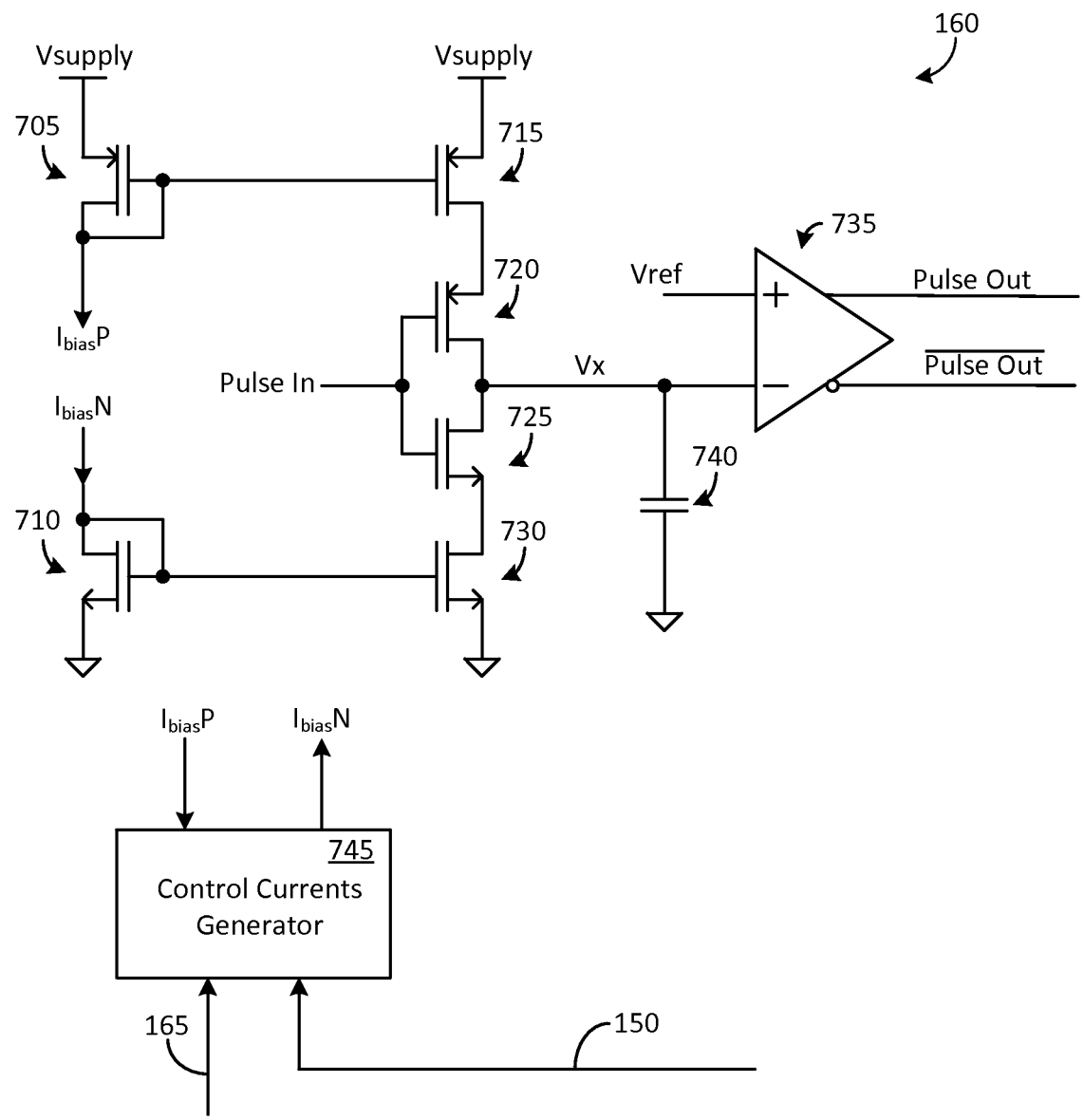
FIG. 7 shows an exemplary pulse width adjusting (PWA) circuit in accordance with the disclosure.
Figure 8:
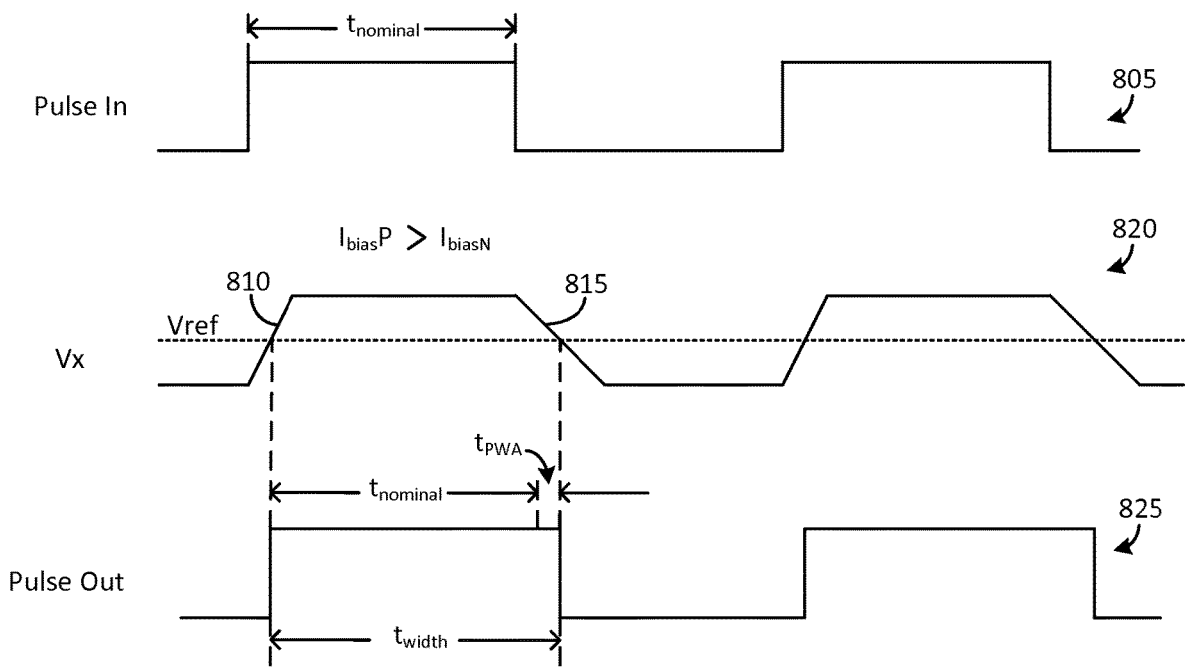
FIG. 8 shows some waveforms associated with the exemplary PWA circuit shown in FIG. 7.

Attention is now drawn to FIGS. 7 and 8. FIG. 7 shows an exemplary embodiment of a PWA circuit 160 in accordance with the disclosure while FIG. 8 shows some waveforms associated with the PWA circuit 160 shown in FIG. 7. Transistors 710, 730, 705, and 715 operate as current mirror circuits and consequently the $I_{bias}P$ and $I_{bias}N$ currents are mirrored from the transistors 705 and 710 to the transistors 715 and 730 respectively.

The "pulse in" signal (waveform 805) determines the on-off switching operation of the transistors 720 and 725. However, as a result of the mirroring effect provided by the transistors 710, 730, 705, and 715, the amplitude of the current flowing through the transistors 720 and 725 is controllable by controlling the amplitudes of the $I_{bias}P$ and $I_{bias}N$ currents. The nature of the rising and falling edges of the current flowing through the transistors 720 and 725 are also controllable by varying the characteristics of the $I_{bias}P$ and $I_{bias}N$ currents. In the example embodiment shown in FIG. 7, the amplitudes of the $I_{bias}P$ and $I_{bias}N$ currents can be controlled by using a control currents generator 745.

The current flowing through the transistors 720 and 725 operates in conjunction with the capacitor 740 to create the waveform 820 (Vx) shown in FIG. 8. Specifically, the slope of the rising edge 810 can be controlled by varying one or both of an amplitude of the $I_{bias}P$ current and a size of the capacitor 740, while the slope of the falling edge 815 can be controlled by varying one or both of an amplitude of the $I_{bias}N$ current and the size of the capacitor 740.

The waveform 820 (Vx) is applied to one input terminal of a comparator 735 and a reference voltage (Vref) is applied to another input terminal of the comparator 735. In one embodiment, the comparator 735 can be implemented as a circuit that provides complementary output signals ("pulse out" and "pulse out bar"). The duty cycle of these output signals can be modified by changing the slope of one or both of the rising edge and the falling edge of the waveform 820 (Vx).

In FIG. 8, which reflects a configuration wherein $I_{bias}P$ is adjusted to be greater than $I_{bias}N$, the slope of the rising edge 810 can be varied (by varying $I_{bias}P$) so as to change the point at which this edge exceeds Vref, thereby setting the time at which the rising edge of the "pulse out" waveform 825 occurs. Similarly, the slope of the falling edge 815 can be varied (by varying $I_{bias}N$) so as to change the point at which this edge falls below Vref thereby setting the time at which the falling edge of the "pulse out" waveform 825 occurs. The time $t_{PWA}$ represents the extent to which the $t_{nominal}$ pulse width of the "pulse out" waveform 825 can be extended to obtain $t_{width}$ (thereby changing the duty cycle of the "pulse out" waveform 825).

Figure 9:
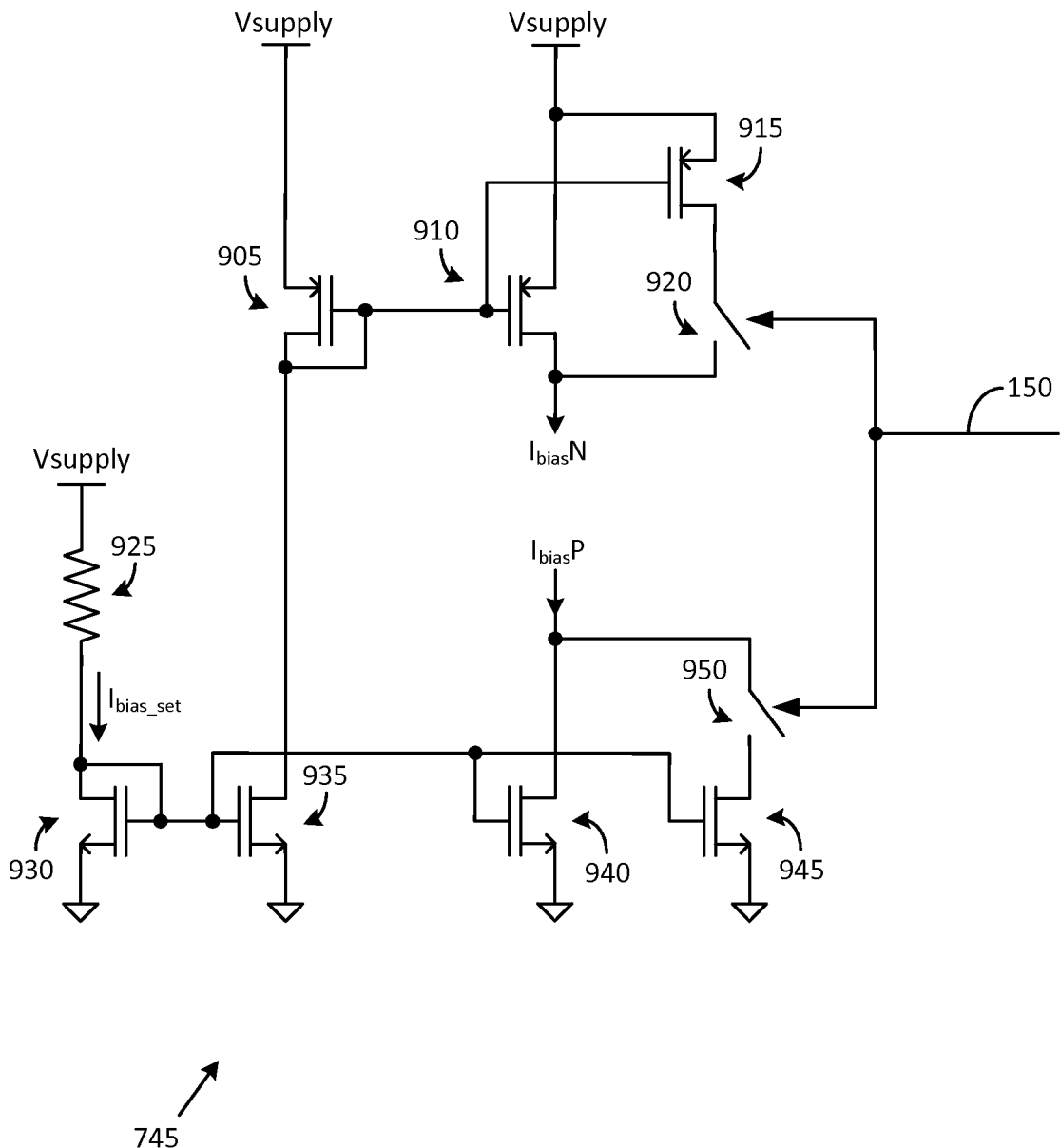
FIG. 9 shows a first exemplary embodiment of a control currents generator that can be a part of the PWA circuit shown in FIG. 7.

FIG. 9 shows a first exemplary embodiment of a control currents generator 745 that is a part of the PWA circuit 160 shown in FIG. 7. In this exemplary embodiment, the $I_{bias}P$ and $I_{bias}N$ currents are generated in accordance with a control signal that is provided on line 150 by the resistor presence detector 145 to the control currents generator 745. In operation, an $I_{bias\_set}$ current is provided to the transistor 930. The $I_{bias\_set}$ current can be provided in various ways. In this example configuration, the $I_{bias\_set}$ current is provided by the use of a resistor 925 that is coupled to a supply voltage. The resistor 925 can be a variable resistor if it is desired to set the $I_{bias\_set}$ current to various selected values. Furthermore, the current Ibias_set can be generated from another circuit (not shown) within the configurable light source driver device 100, or provided via one or more externally accessible terminals of the configurable light source driver device 100.

The $I_{bias\_set}$ current propagating through the transistor 930 causes a minor current to flow through a transistor 935 and also through a transistor 905 that is connected in series with transistor 935. The transistor 905 in turn serves to cause a minor current to flow through the transistor 910 (when a switch 920 is placed in an open state) and through a combination of the transistor 910 and the transistor 915 (when the switch 920 is placed in a closed state). More particularly, the transistor 915 is selectively connected in parallel to the transistor 910 on the basis of the state of the switch 920. Thus, when the switch 920 is placed in a closed state, the transistor 915 is connected in parallel with the transistor 910, thereby modifying the value of the $I_{bias}N$ current. On the other hand, when the switch 920 is placed in an open state, the $I_{bias}N$ current is provided exclusively by the transistor 910. The state of the switch 920 is determined by the control signal that is provided on line 150 by the resistor presence detector 145. The control signal can be, for example, a logic "1" condition that is indicative of the configurable light source driver device 100 being placed in a differential driver configuration or a logic "0" condition that is indicative of the configurable light source driver device 100 being placed in a single-ended driver configuration.

The portions of the $I_{bias}N$ current that are contributed by each of the transistor 910 and the transistor 915 can be pre-set so as to be either equal to one another or to be different from one another. When different from one another, the individual contributions to the $I_{bias}N$ current (by each of the transistor 910 and the transistor 915) can be pre-set for example, by selecting the transistor 915 to have a different geometry than the transistor 910. The procedure by which a geometry-based transistor selection is carried out (by selecting transistors having different width-to-length (W/L) ratios in their gates, for example) is known in the art and will not be elaborated upon herein. The geometry-based transistor selection can be further applied to various other transistors, such as for example, the transistor 905 with respect to the transistor 910, the transistor 935 with respect to the transistor 940, and/or the transistor 940 with respect to the transistor 945.

Turning now to the $I_{bias}P$ current generation portion of the control currents generator 745, when the switch 950 is placed in a closed state, the transistor 945 is connected in parallel with the transistor 940, thereby modifying the value of the $I_{bias}P$ current. On the other hand, when the switch 950 is placed in an open state, the $I_{bias}P$ current is provided exclusively by the transistor 940. The control signal that is provided on line 150 by the resistor presence detector 145 is used to set the open or closed states of the switch 950.

It should be understood that in the example embodiment shown in FIG. 9, the control signal that is provided on line 150 is used to simultaneously control both the switch 920 as well as the switch 950. However, in other embodiments, individual control signals may be provided to the switch 920 and the switch 950, which provides certain benefits such as for example, individual control of the $I_{bias}N$ current generation and $I_{bias}P$ current generation. Furthermore, in these other embodiments, the control signal carried on the line 150 can be provided to a control signals generation block (not shown) that may generate a variety of switch signals as well as control signals in addition to those used for controlling the switch 920 and the switch 950 (such as for example a control signal to change the $I_{bias\_set}$ current flowing through the transistor 930). The number of transistors that are placed in parallel with each of the transistors 910 and 940 can also be more than the single transistors 915 and 945 that are described in the exemplary embodiment shown in FIG. 9.

Figure 10:
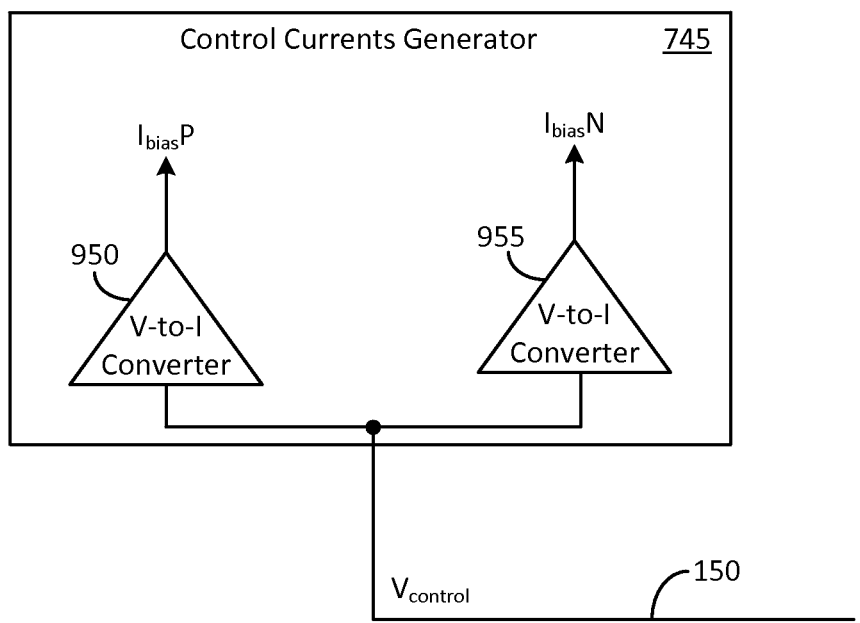
FIG. 10 shows a second exemplary embodiment of a control currents generator that can be a part of the PWA circuit shown in FIG. 7.

FIG. 10 shows a second exemplary embodiment of a control currents generator 745 that is a part of the PWA circuit 160 shown in FIG. 7. In this embodiment, the $I_{bias}P$ and $I_{bias}N$ currents are generated from a $V_{control}$ voltage that is provided on line 150 by the resistor presence detector 145. Specifically, the $I_{bias}P$ current is generated from the $V_{control}$ voltage by using a first transconductance amplifier 950, and the $I_{bias}N$ current is generated from the $V_{control}$ voltage by using a second transconductance amplifier 955. In one example implementation of this embodiment, the transconductance provided by the first transconductance amplifier 950 can be set to a first value by incorporating a first set of components (not shown) such as for example, resistors and capacitors, and the transconductance provided by the second transconductance amplifier 955 can be set to a different value by using a different set of components (not shown). Thus, the transconductance provided by the first transconductance amplifier 950 can be set to provide an $I_{bias}P$ current of a first value and the transconductance provided by the second transconductance amplifier 955 can be set to provide an $I_{bias}N$ current of a different value, if so desired.

In summary, it should be noted that the invention has been described with reference to a few illustrative embodiments for the purpose of demonstrating the principles and concepts of the invention. It will be understood by persons of skill in the art, in view of the description provided herein, that the invention is not limited to these illustrative embodiments. For example, the invention has been described with respect to a current source 140 that is operative via a positive voltage bias (Vsupply) applied to the light source 110. However, in an alternative embodiment, the current source 140 and the light source 110 may be suitably configured to operate using a negative voltage supply instead. Similarly, the polarity of various pulse signals (such as for example the control signals provided by the control circuit 105) can be of an opposite polarity to the ones described herein when appropriate to do so. In another alternative embodiment, the resistor sensing terminal 125 can be configured as an impedance sensing terminal that is provided in order to connect a passive or an active impedance element (for example, a diode or a light emitting diode (LED)) to the configurable light source driver device 100, rather than the resistor 120. Correspondingly, the resistor presence detector 145 can be replaced by an impedance presence detector, a diode presence detector or an LED presence detector. In yet another alternative embodiment, the presence detector can be omitted entirely and an externally accessible terminal can be provided through which an identification signal can be used to indicate to the configurable light source driver device 100, the nature of the element connected to the element sensing terminal 125 (i.e., a resistor, a diode, an LED etc.). Persons of skill in the art will understand that many such variations can be made to the illustrative embodiments without deviating from the scope of the invention.

What is claimed is:

1. An integrated circuit comprising:
    circuitry configured to place the integrated circuit in a low electro-magnetic interference (EMI) mode of operation during a first time period, and to place the integrated circuit a low power mode of operation during a second time period different from the first time period, the low EMI mode of operation characterized by placing a light source in a pulsed mode of operation when the light source is coupled to a first externally-accessible terminal of the integrated circuit and a resistor is coupled to a second externally-accessible terminal of the integrated circuit, the low power mode of operation characterized by placing the light source in the pulsed mode of operation when the light source is coupled to the first externally-accessible terminal of the integrated circuit and the second externally-accessible terminal of the integrated circuit is left unconnected; and
    a resistor presence detector circuit configured to detect a presence of the resistor when coupled to the second externally-accessible terminal and to generate a first detector output signal that is provided to the circuitry for placing the integrated circuit in the low EMI mode of operation.

2. The integrated circuit of claim 1, wherein the circuitry comprises:
    a current source; and
    a first switch operable to place the light source in the pulsed mode of operation, the pulsed mode of operation of the light source characterized by a first pulsed current draw from a power supply; and
    a second switch operable to effectuate a second pulsed current draw from the power supply and through the resistor when the integrated circuit is placed in the low EMI mode of operation, the second pulsed current draw having an opposite polarity to the first pulsed current draw.

3. The integrated circuit of claim 1, wherein the circuitry comprises:
    a current source;
    a first switch coupled between the current source and the first externally-accessible terminal; and
    a second switch coupled between the current source and the second externally-accessible terminal.

4. The integrated circuit of claim 3, wherein the first switch receives a first control signal, and wherein the second switch receives a second control signal.

5. The integrated circuit of claim 4, wherein in the low EMI mode of operation, when the first control signal is high, the second control signal is low, and when the first control signal is low, the second control signal is high.

6. The integrated circuit of claim 5, wherein in the low EMI mode of operation, a node coupled to the first switch, the second switch, and the current source has a substantially constant voltage.

7. The integrated circuit of claim 4, further comprising:
    a control circuit that provides the first control signal and the second control signal.

8. The integrated circuit of claim 1, wherein the low power mode operation consumes less power than the low EMI mode of operation.

9. The integrated circuit of claim 1, wherein the integrated circuit includes a third externally-accessible terminal that receives a signal to modify an operating parameter of the light source.

10. The integrated circuit of claim 9, wherein the resistance presence detector includes a voltage detector or a current detector.

11. An integrated circuit comprising:
    circuitry configured to selectively place the integrated circuit in either a low electro-magnetic interference (EMI) mode of operation or a low power mode of operation, the low EMI mode of operation characterized by placing a light source in a pulsed mode of operation when the light source is coupled to a first externally-accessible terminal of the integrated circuit and a resistor is coupled to a second externally-accessible terminal of the integrated circuit, the low power mode of operation characterized by placing the light source in the pulsed mode of operation when the light source is coupled to the first externally-accessible terminal of the integrated circuit and the second externally-accessible terminal of the integrated circuit is left unconnected, wherein the circuitry comprises:
    a current source;
    a first switch operable to place the light source in the pulsed mode of operation, the pulsed mode of operation of the light source characterized by a first pulsed current draw from a power supply; and
    a second switch operable to effectuate a second pulsed current draw from the power supply and through the resistor when the integrated circuit is placed in the low EMI mode of operation, the second pulsed current draw having an opposite polarity to the first pulsed current draw;
    a control circuit configured to provide a first switch control signal for actuating the first switch to place the light source in the pulsed mode of operation, and a second switch control signal for actuating the second switch to produce the second pulsed current, the second switch control signal having an opposite polarity to the first switch control signal; and
    a resistor presence detector circuit configured to detect a presence of the resistor when coupled to the second externally-accessible terminal and to generate a first detector output signal that is provided to the control circuit for placing the integrated circuit in the low EMI mode of operation.

12. The integrated circuit of claim 11, wherein the resistor presence detector circuit is further configured to detect an absence of the resistor and generate a second detector output signal that is provided to the control circuit for placing the integrated circuit in the low power mode of operation, the low power mode of operation characterized by the control circuit disabling the second switch control signal.

13. The integrated circuit of claim 11, wherein the control circuit is configured to receive a pulse input and use the pulse input to generate the first switch control signal and the second switch control signal.

14. The integrated circuit of claim 11, wherein the control circuit is configured to adjust a pulse width of at least one of the first switch control signal or the second switch control signal based on a detector output signal provided to the PWA circuit by the resistor presence detector circuit.

15. The integrated circuit of claim 11, wherein the control circuit is configured to select a first stabilization circuit that provides a first level of circuit stability when the resistor presence detector circuit detects coupling of the resistor to the second externally-accessible terminal, and to select a second stabilization circuit that provides a second level of circuit stability when the resistor presence detector circuit detects a lack of coupling of the resistor to the second externally-accessible terminal.

16. A method of using an integrated circuit, comprising:
    making a determination to operate the integrated circuit in one of a low electro-magnetic interference (EMI) mode of operation or a low power mode of operation;
    when determined to operate the integrated circuit in the low EMI mode of operation, coupling a light source to a light source driver terminal of the integrated circuit and coupling a resistor to a resistor sensing terminal of the integrated circuit;
    when determined to operate the integrated circuit in the low power mode of operation, coupling the light source to the light source driver terminal of the integrated circuit and leaving the resistor sensing terminal of the integrated circuit unconnected;
    using a resistor presence detector circuit to detect the coupling of the resistor to the resistor sensing terminal and providing a detector output signal from the resistor presence detector circuit to a control circuit; and
    using the control circuit to place the integrated circuit in one of the low EMI mode of operation or the low power mode of operation based on the detector output signal.

17. The method of claim 16, wherein the integrated circuit includes a terminal that receives a signal to modify an operating parameter of the light source.

18. The method of claim 16, wherein coupling the resistor to the resistor sensing terminal of the integrated circuit comprises selecting a resistance value of the resistor to set a first pulsed current draw through the resistor to be substantially equal to a second pulsed current draw through the light source.

19. The method of claim 16, wherein coupling the resistor to the resistor sensing terminal of the integrated circuit comprises selecting a resistance value of the resistor to obtain a first voltage swing across the resistor that substantially matches a second voltage swing across the light source.

20. The method of claim 16, wherein coupling the resistor to the resistor sensing terminal of the integrated circuit comprises selecting a resistance value of the resistor on the basis of an EMI threshold level.

* * * * *